(12) United States Patent
Hyers

(10) Patent No.: US 12,050,059 B2
(45) Date of Patent: Jul. 30, 2024

(54) LEAK FREE CURRENT COLLECTOR ASSEMBLAGE FOR METALLURGICAL VESSEL AND METHODS OF MANUFACTURE

(71) Applicant: Boston Electrometallurgical Corporation, Woburn, MA (US)

(72) Inventor: Robert Wyatt Hyers, Winchester, MA (US)

(73) Assignee: Boston Electrometallurgical Corporation, Woburn, MA (US)

( * ) Notice: Subject to any disclaimer, the term of this patent is extended or adjusted under 35 U.S.C. 154(b) by 722 days.

(21) Appl. No.: 16/272,399

(22) Filed: Feb. 11, 2019

(65) Prior Publication Data

US 2019/0186834 A1    Jun. 20, 2019

Related U.S. Application Data

(63) Continuation of application No. PCT/US2017/046695, filed on Aug. 14, 2017.
(Continued)

(51) Int. Cl.
    *F27B 3/08*   (2006.01)
    *C25C 7/02*   (2006.01)
    (Continued)

(52) U.S. Cl.
    CPC .............. *F27B 3/085* (2013.01); *C25C 7/02* (2013.01); *H01M 4/64* (2013.01); *H01M 4/66* (2013.01);
    (Continued)

(58) Field of Classification Search
    None
    See application file for complete search history.

(56) References Cited

U.S. PATENT DOCUMENTS

| | | | | |
|---|---|---|---|---|
| 3,274,093 A | * | 9/1966 | McMinn | .................... C25C 3/16 |
| | | | | 204/247.3 |
| 3,649,480 A | * | 3/1972 | Johnson | .................... C25C 3/16 |
| | | | | 205/374 |

(Continued)

FOREIGN PATENT DOCUMENTS

| | | |
|---|---|---|
| CN | 103184476 A | 7/2013 |
| JP | 60181583 A | 9/1985 |

(Continued)

OTHER PUBLICATIONS

Blais et al, Optimization of the cathode block shape of an aluminum electrolysis cell, Applied Thermal Engineering, vol. 58, No. 1-2, Sep. 2013, pp. 439-446 (Year: 2013).*

(Continued)

*Primary Examiner* — Harry D Wilkins, III
(74) *Attorney, Agent, or Firm* — Kilpatrick Townsend & Stockton LLP

(57) ABSTRACT

Methods of manufacturing a current collector assembly may include iteratively solving a model on a computer. The model may utilize received inputs including a variable number and arrangement of conductive elements to determine as an output a heat distribution within a hypothetical current collector assembly. The methods may also include identifying as a solution to the model a number and arrangement of conductive elements coupled with a current collector that produces a contained heat distribution within the hypothetical current collector assembly. The methods may also include manufacturing the current collector assembly, and the current collector assembly may include a defined plurality of apertures within a refractory base of the current collector assembly in a pattern configured to receive the number and arrangement of conductive elements identified as the solution to the model.

20 Claims, 13 Drawing Sheets

Related U.S. Application Data

(60) Provisional application No. 62/374,690, filed on Aug. 12, 2016.

(51) Int. Cl.
*H01M 4/64* (2006.01)
*H01M 4/66* (2006.01)
*H01M 50/528* (2021.01)
*H01M 50/529* (2021.01)

(52) U.S. Cl.
CPC ......... *H01M 4/661* (2013.01); *H01M 50/528* (2021.01); *H01M 50/529* (2021.01)

(56) References Cited

U.S. PATENT DOCUMENTS

| | | | |
|---|---|---|---|
| 4,462,885 A | | 7/1984 | Kato et al. |
| 4,612,103 A | * | 9/1986 | Dewing ............... C25C 3/16 204/247.3 |
| 4,613,418 A | * | 9/1986 | Dewing ............... C25C 3/16 204/247.1 |
| 4,737,253 A | * | 4/1988 | Gesing ............... C25C 3/08 204/247.3 |
| 5,071,533 A | * | 12/1991 | de Nora ............... C25C 3/08 204/247.3 |
| 5,142,650 A | | 8/1992 | Otojiro et al. |
| 2008/0198894 A1 | | 8/2008 | Matschullat |
| 2009/0197157 A1 | | 8/2009 | Viavattine |
| 2010/0136381 A1 | | 6/2010 | Yang |
| 2011/0305948 A1 | | 12/2011 | Miya Take et al. |
| 2012/0328921 A1 | | 12/2012 | Kawaoka |
| 2015/0284863 A1 | * | 10/2015 | Gusev ............... C25C 3/08 204/247.4 |
| 2015/0337446 A1 | * | 11/2015 | Gusev ............... C25C 3/08 204/287 |

FOREIGN PATENT DOCUMENTS

| | | |
|---|---|---|
| SU | 910853 A1 | 3/1982 |
| WO | 2018/031984 A1 | 2/2018 |

OTHER PUBLICATIONS

Xifeng et al, An Improved Finite Element Model for Thermal Balance Analysis of Aluminum Electrolysis Cells, in Grandfield et al (eds), Light Metals, 2014 (no month), pp. 661-666 (Year: 2014).*
"Del" from Wikipedia accessed at https://en.wikipedia.org/wiki/Del on Jul. 2, 2020 (Year: 2020).*
Electric Potential, excerpt of The Physics Hypertextbook, available online at https:physics.info/electric-potential/, Aug. 2016, (Date verified via archive.org http://web.archive.org/web/20160806160542/https://physics.info/electric-potential/) (Year: 2016).*
PCT/US17/46695 received an Invitation to Pay Additional Fees mailed Oct. 3, 2017, 2 pages.
PCT/US17/46695 received an International Search and Written Opinion mailed Dec. 4, 2017, 9 pages.
EP17840400.0 received an Extended European Search Report mailed Mar. 9, 2020, 8 pages.
Chinese Application No. CN201780049534.5 received and Office Action, mailed Jun. 17, 2021, 10 pages.

* cited by examiner

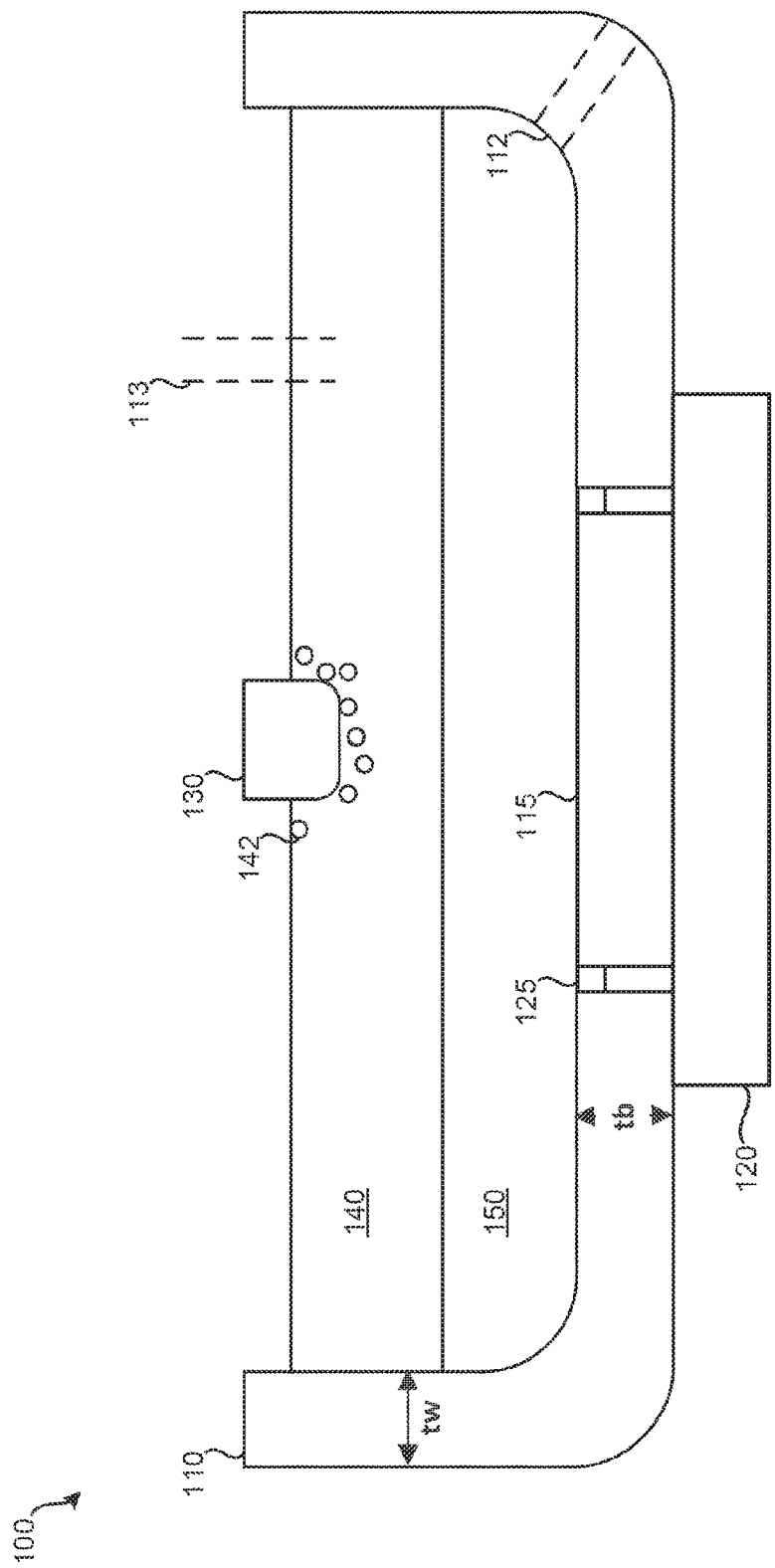

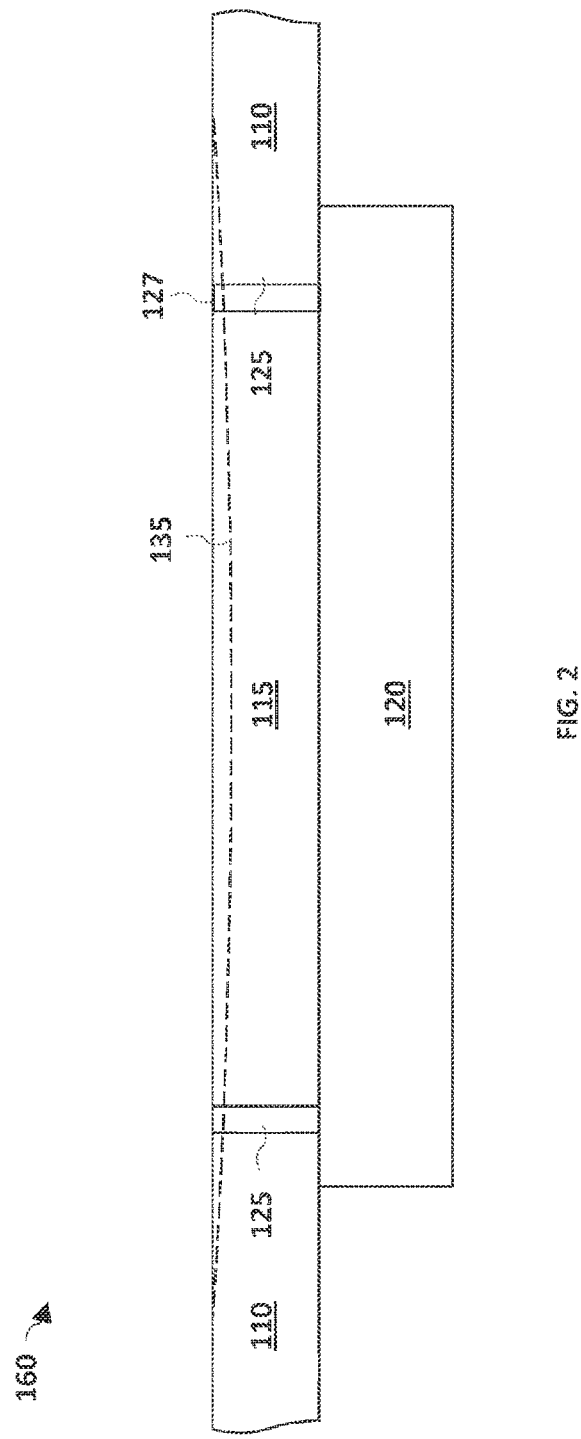

LEAK FREE CURRENT COLLECTOR ASSEMBLAGE FOR METALLURGICAL VESSEL AND METHODS OF MANUFACTURE

CROSS-REFERENCE TO RELATED APPLICATIONS

This application is a continuation of International PCT Application No. PCT/US2017/046695, filed Aug. 14, 2017, which claims priority to U.S. Provisional Patent Application No. 62/374,690, filed Aug. 12, 2016, the disclosures of which are hereby incorporated by reference in their entireties for all purposes.

TECHNICAL FIELD

The present disclosure relates to cost-effective processing of molten materials. In particular, metallurgical vessels with specially designed components to control the thermal, electrical and electrochemical environment at high temperature are disclosed.

BACKGROUND OF THE INVENTION

Various metallurgical vessels (e.g. electric arc furnaces in which the product of interest is refined at temperature] or furnaces designed to form metals electrolytically) require an electrical connection between molten metal and an external source of electricity. In many such technologies, extremely high electrical current is required to be delivered at high temperature. The required current may reach many hundreds of thousands of amperes; in terms of current density, the range may be very large spanning 0.1-50 amperes/cm$^2$. Current, which may be in the hundreds, thousands, or hundreds of thousands of amperes, so transported through the vessel will generate Joule heating. Transported current may routinely be between about 1,000 and about 5,000 amperes, or between about 5,000 and about 10,000 amperes in embodiments. The current may be any individual amount within these ranges, such as for example 4,000 amperes, or may be above or below any of the stated numbers. The need to maintain a reliable electrical connection at high temperature with simultaneous containment of molten material presents a challenge. During operation, system perturbations are known to occur as a result of process initiation or development. For example, generated heat flow patterns within the system may not be uniform or regular; particular components may be corrupted from such conditions which are outside of what would be considered equilibrium. Inhomogeneous heat transfer may compromise the structure causing vessel failure. Conventional systems designers have dealt with these types of concerns 1) by intentional over-designing the operational requirements of the system or 2) by requiring sub-optimal operating conditions that tend not to produce acceptable material quality/purity. A continuing problem with present designs is that an initially small leak will quickly grow and become a major vessel breach, resulting in lost production, downtime, expensive repairs, and the risk of injury or death.

Refer to FIG. 8: An initial charge of metallic material 30 is enclosed by walls 20 of metallurgical vessel 100. Outer wall segments 21, cover 23 and outer base 24. Outer base 24 is shaped to support the refractory inner base 11, and is commonly affixed to structural members (not shown) that support the cell, either from the floor or from some other support structure is usually made of structural material. Inner wall segments 22, as well as inner base 11 are made of high temperature refractory material which, by definition, is difficult to melt, fuse or distort at high temperature. Thus, the particular refractory arrangements for both inner wall segments 22 and inner base 11 are chosen depending on what metal-containing material is being processed and melted and how much superheat is deemed necessary. Electrodes 130, 30, shown to illustrate cell circuit configuration are typically (and in all of the illustrations supra) paired so that the potential difference between them is established essentially from top to bottom of vessel 100. A power source 180 (generally high current, low voltage) completes the circuit.

The term "current collector" herein refers to a multicomponent element 40, 125 necessarily in direct communication with an electrode. In many of the applications of interest here, the current collector is in electrical communication with the cathode. In molten oxide electrolysis, current is fed to the anode (130 in FIG. 8) and passes through the molten oxide electrolyte 50 toward a cathode 30 which, during operation, is also molten and comprises the desired metal product. Refer also to FIG. 9A. Current collector 12 consists of block 40 in electrical communication with a current source via buses 170. Pins, rods or bars of material 125 of current collector 12 are disposed within openings/apertures 126 in base 11 of metallurgical vessel 100 and configured to have a hot bar end 35 disposed proximal to metallic material (acting as cathode) 30. Current collectors in present use have two main causes of failure. The first cause of failure is fundamental to thermal design. Commonly, copper pins, rods or bars 125 that are intentionally cooled either by forced air or water are used. As the temperature of the molten metallic metal (acting as cathode) 30 proximal to collector rods 125 is much higher than the melting point of copper, if and when cooling becomes ineffective, rapid, catastrophic melting and/or erosion of pins 125 occurs. If cooling is not totally compromised, pins 125 will slowly erode during continued operation of vessel 100 requiring a rebuild in short order. The second type of failure results from cracking or erosion of the refractory of inner base 11 between the pins 25. This allows ingress of liquid metal into the seal area (essentially, aperture 126) between pin 125 and the refractory base 11. The flow carries sufficient heat to melt and/or dissolve the pin. The first liquid metal to egress from the reactor is followed by more liquid metal which is hotter and which can dissolve still more of the remaining pin, accelerating the leak to a full breach of vessel 100. There is a long-felt need to increase time of operation of such metallurgical vessels.

BRIEF SUMMARY OF THE INVENTION

A leak-free current collector assemblage is provided in a first embodiment. The assemblage is integral with a metallurgical vessel, the vessel having an active zone for processing and holding liquid metal-containing material, the current collector assemblage having a current collector that has a plurality of electrically and thermally conductive elements. The elements are in electrical and thermal communication with the active zone, the elements having a length, a width, a length-to-width ratio. The current collector assemblage has a block wherein the block is in electrical communication with a source of current and wherein, the elements are in electrical and thermal communication with the block at a plurality of element locations establishing fixation points for each element. The current collector assemblage has an assemblage portion of a refractory structure, the assemblage portion disposed contiguous with the current collector. The assemblage portion has a plurality of openings indexable with the element locations, the openings capable of accepting and encasing enclosable portions of the length of each element therein. The structure defines a boundary of the active zone of the vessel. The metallurgical vessel may be used as an electric arc furnace, for molten oxide electrolysis, or as a Hall-Héroult cell in additional embodiments.

A method of manufacturing a leak-free current collector assemblage is provided in another embodiment, the method has a step of solving a model on a computer, utilizing received inputs including a variable number and arrangement of electrically and thermally conductive elements to determine, as an output, a heat distribution within a hypothetical current collector assemblage. The method has another step of identifying, as a solution to the model, a number and arrangements of elements coupled with a current collector that generates the heat distribution within the hypothetical current collector assemblage. The method also has a step of then manufacturing the current collector assemblage. The current collector assemblage has a defined plurality of apertures within an assemblage portion of a refractory structure. The apertures are disposed in a pattern configured to receive the number and arrangement of conductive elements identified as the solution to the model.

In another embodiment, a non-transitory computer readable medium having stored thereon computer executable instructions is provided. The instructions, when executed by a processor, cause the processor to iteratively solve a model, utilizing received inputs including a variable number and arrangement of conductive elements, to determine as an output a heat distribution within a hypothetical current collector assembly. The processor may also be caused to identify as a solution to the model a number and arrangement of conductive elements coupled with a current collector that produces a contained heat distribution within the hypothetical current collector assemblage. The processor may also be caused to output a graphical depiction of an isotherm at the melting point of a given metal-containing material contacting the hypothetical current collector assembly. In some embodiments the processor may also be caused to output a pattern to a machining tool that manufactures the current collector assembly, wherein the pattern comprises a defined plurality of apertures within a refractory base of the current collector assembly in a pattern configured to receive the number and arrangement of conductive elements identified as the solution to the model. Iteratively solving the model may include receiving as at least one of the inputs an initial number and arrangement of conductive elements. Iteratively solving the model may include accessing a database of physical and electrical properties for a given metal-containing material and the current collector assembly. Iteratively solving the model may include defining constraints for the model. Iteratively solving the model may include repetitively calculating the heat distribution within the current collector assembly while updating the number and arrangement of conductive elements. Iteratively solving the model may include repetitively comparing the heat distribution within the current collector assembly to the defined constraints for the model. Iteratively solving the model may also include determining a number and arrangement of conductive elements providing a contained temperature distribution within the current collector assembly that satisfy the defined constraints for the model.

In a further embodiment, a leak-free current collector assemblage is provided. The assemblage is integral with a metallurgical vessel, the vessel having an active zone for processing and holding a liquid metal-containing material, the current collector assemblage having a current collector that has a plurality of elongate elements. The elements have a predetermined length, a predetermined width, and a predetermined total number in the plurality. The assemblage has a block that is in electrical communication with a source of electric current. The block is in electrical and thermal communication with the elements. The plurality of elements is coupled with the block at a plurality of element locations establishing fixation points for each element. The assemblage also has an assemblage portion of a refractory structure with the assemblage portion disposed contiguous with the current collector. The assemblage portion has apertures capable of accepting and encasing an enclosed portion of the length of each element therein, the structure defining a boundary of the active zone of the vessel. Predetermination of the length, the width, the element locations, the number, dimensions of the block, and dimensions of the assemblage portion of the refractory structure disposed in the vessel are made to ensure thermal and fluidic equilibrium at a desired process temperature of and a desired current within the liquid metal-containing material to prevent leakage of liquid.

BRIEF DESCRIPTION OF THE DRAWINGS

FIG. 1B illustrates a cross-sectional view of an exemplary metallurgical vessel under operating conditions.

FIG. 2 illustrates a partial cross-sectional view of an exemplary metallurgical vessel according to embodiments of the present technology.

DETAILED DESCRIPTION OF THE INVENTION

(i) Leak-Free Current Collector Assemblage Component of a Metallurgical Vessel In metallurgical processing, heat generated within a metallurgical container/vessel 100 is used to melt, homogenize, refine and/or otherwise process a variety of materials including metals and metal-containing materials. These materials may have melting points in excess of 1,000° C.; thus, vessel 100 and any associated components in contact with the molten materials would also be subject to these high temperatures. Locations where thermally conductive components make physical contact or are otherwise thermally engaged inevitably result in structural weak points that, during vessel operation, may become the source of leaks. Leaks may also originate from voids or defects originated as a result of continued use of vessel 100 under high-stress conditions for an extended time period.

Figure 1A:
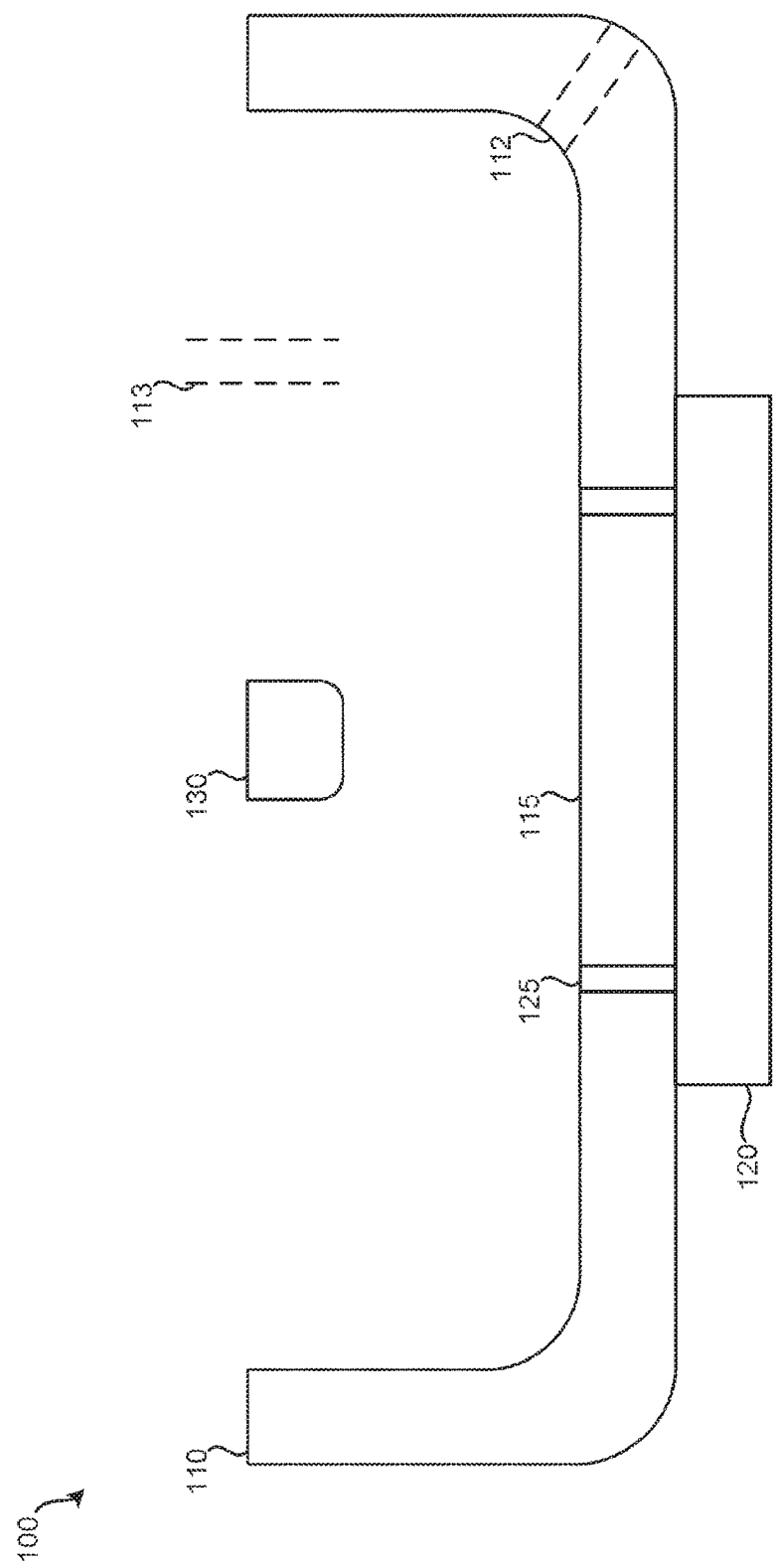
FIG. 1A illustrates a cross-sectional view of an exemplary metallurgical vessel.
Figure 8:
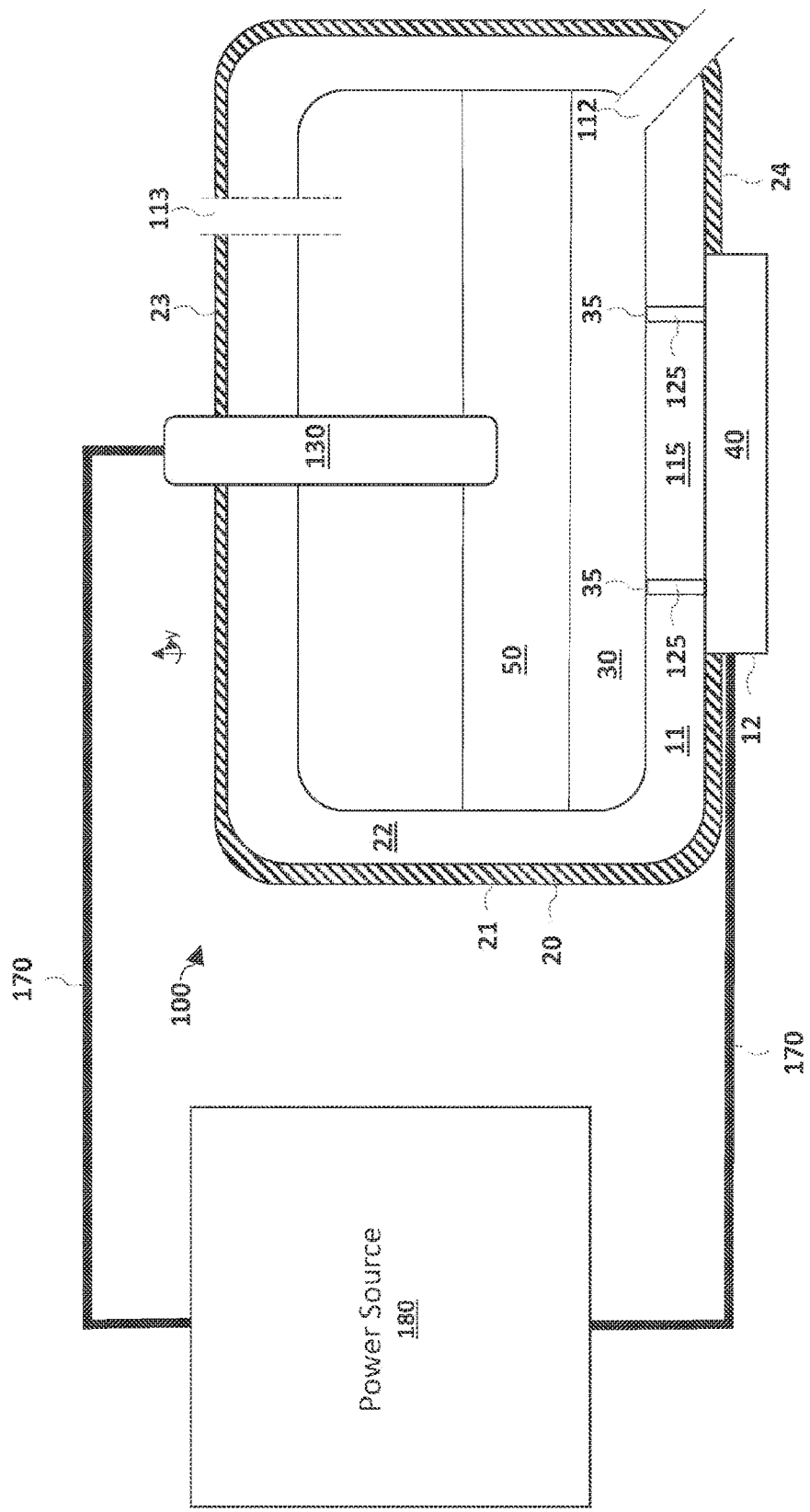
FIG. 8 illustrates a cross-sectional view of an exemplary metallurgical vessel.

Refer to FIGS. 1A and 1B. A cross-sectional view of a portion of an exemplary metallurgical vessel 100 designed for melting and processing is illustrated. (Note that when FIGS. 1A and 1B are compared with FIG. 8, the outer walls 21, the cover 23 and the outer base 24 of vessel 100 are only depicted in FIG. 8.) The requisite heat may be generated by electrical energy or other methods known in the art. Electrode 130 (likely fixedly attachable through cover 23) is included in FIGS. 1A and 1B as evidence that electrical energy is capable of being provided given a current source (not shown) coupled with electrode 130 and in electrical communication with the contents 140 and 150 of the vessel, and eventually with the block 120, which constitutes the return path for the current. Activation of a resultant electrolytic cell within vessel 100 is displayed in FIG. 1B. For example, in molten oxide electrolysis, electrode 130 would serve as an anode with oxygen or carbon monoxide gas bubbles 142 evolving nearby. Vessel 100 has a refractory structure including inner refractory walls 110 and refractory base 115. Suitable ranges of the physical dimensions of walls 110 and base 115 are known in the art of furnace design. For example, thickness tw of walls 110 and fb of base 115 are usually determined by thermal and chemical requirements, manufacturing requirements, and reliability concerns; typical ranges are a few cm to a few 10's of cm The refractory structure is generally fabricated from various non-metallic high temperature materials. The refractory structure 110, 115 typically is composed of high melting point/high yield point metals or ceramics including but not limited to carbon-containing materials, oxides, carbides, and/or nitrides of silicon, calcium, magnesium, aluminum, zirconium, hafnium, tungsten, and boron. Additional materials may be used wherein such materials are capable of withstanding temperatures greater than 100° C., 500° C., 1,000° C., and higher, without deleterious degradation or significant reaction with materials contained within vessel 100. As illustrated, vessel 100 may, in any number of designs, include inlet 113 by which material is introduced to the vessel 100, such as metal-containing materials for processing, electrolyte materials, etc. Outlet port 112 is configured such that, when open, allows refined or otherwise processed materials to exit from vessel 100 and be collected. It will be readily appreciated that inlets and outlet ports (in no way limited to a single inlet or a single outlet port) may be positioned in a variety of ways known to those of skill in the art; their design is not considered limited to the exemplary design illustrated. The contents of the vessel often consist of two or more layers. For example, in MOE, the upper layer 140 is the electrolyte and lower layer 150 is the metal product.

Figure 3:
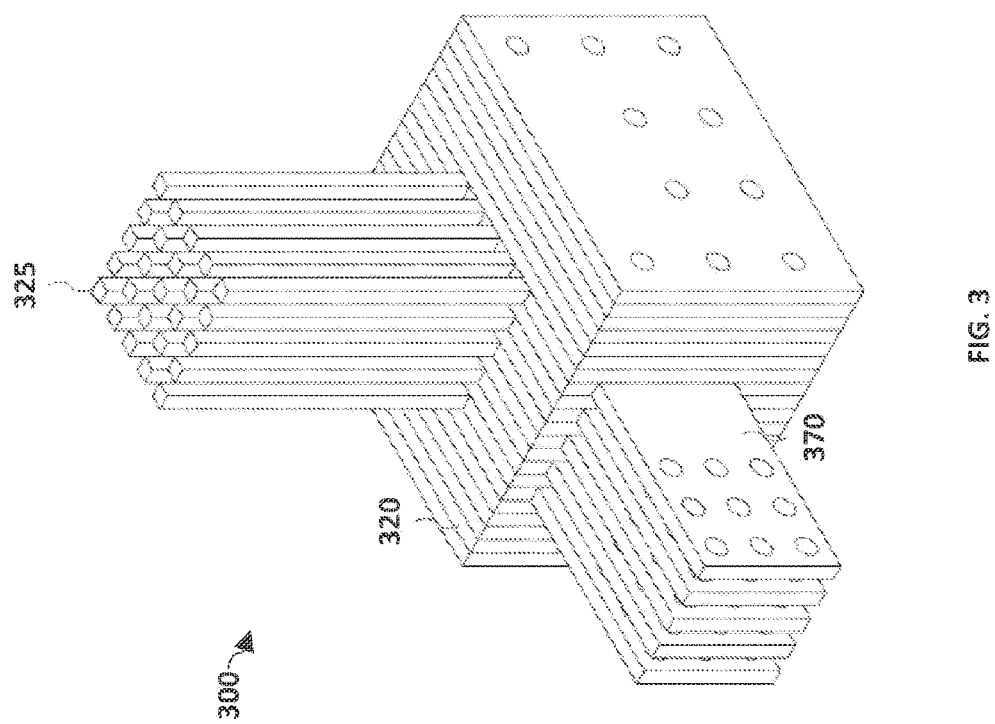
FIG. 3 illustrates a perspective view of a current collector according to embodiments of the present technology.

See also FIG. 3. Metallurgical vessel 100 also includes current collector block 120, 320 electrically coupled to a current source by bus 370. For some vessel applications, the current collector may receive current through materials in the vessel 100, and may provide electrons to materials in the vessel through conductive elements 125 of the current collector that are fixedly attached to block 120, 320. A portion of a length 1 of conductive elements 125, 325 may be in direct contact with materials within vessel 100 as elements 125 may extend into vessel 100 having 1 greater than th. The current collector may operate as an electrode in some vessel applications; for example, in an electric arc furnace situation, in opposition to anode 130 the current collector operates as the cathode. An electric cell would then consist of anode 130, current collector/cathode 120 (320) plus 125, with current flow through materials contained within and to be processed in vessel 100.

Figure 9A:
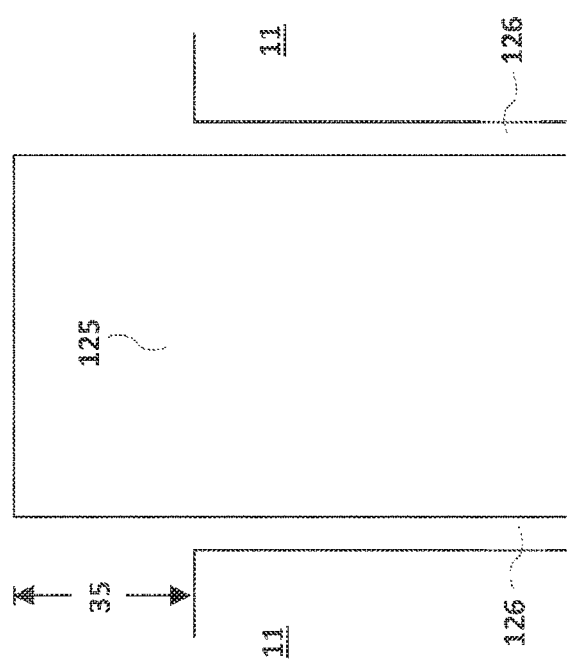
FIG. 9A illustrates a cross-sectional view of an exemplary metallurgical vessel.

Current collector conductive elements 125 extend for their length 1 from their respective fixation points upon current collector block 120, through base apertures 126 disposed through the entire thickness, tb of refractory base 115. See, generally, FIG. 9A. Portions of conductive elements 125 may extend beyond refractory base 115, those portions extend into an active zone 150 (FIG. 1B) of vessel 100 where they are, when vessel 100 is at or is, in operation, approaching an intended processing temperature, prone to melt.

While (in FIGS. 1A, 1B and 2) exactly two conductive elements 125 are shown for illustrative purposes, each within a matching base aperture 126, it is to be understood, by intentional design and plan, that any number of conductive elements as well as variations in possible spatial patterns of conductive elements 125 (and corresponding base apertures 126) define the scope of this disclosure as will be explained in detail below. In FIG. 3, a pattern of 25 conductive elements in a spatial array resembling a square are illustrated. Refractory base 115 would necessarily include a plurality of apertures 126 within refractory base 115 disposed in a pattern similar to or, likely, identical with the spatial array of conductive elements 125. Each conductive elements would then he positioned within a corresponding aperture of the refractory base 115 having lengths greater than or less than tb.

An initial amount of processable material may be introduced into vessel 100. The material may include an ore, an electrolyte, slag, coke, or other refractory or furnace materials. For example, as shown in FIG. 1B, when electrolysis is the operation, region 140 shown proximal to anode 130 contains electrolyte as part of the generated electrolytic cell, while active zone 150 is the region where the material to be processed resides during operation. The processed metal-containing material (in MOE) is removable, through refractory base 115 via outlet port 112. In molten oxide electrolysis processing, electrode 130 is the anode; current passes through the anode first into the region 140 containing molten electrolyte materials, next into the active zone 150 of vessel 100, and then through conductive elements 125 to the collector block 120. Current, which may be in the hundreds, thousands, or hundreds of thousands of amperes, so transported through the vessel will generate Joule heating. Transported current may routinely be between about 1,000 and about 5,000 amperes, or between about 5,000 and about 10,000 amperes in embodiments. The current may be any individual amount within these ranges, such as for example 4,000 amperes, or may be above or below any of the stated numbers. The generated heat is intended to develop vessel temperatures sufficient to melt the materials within the vessel. For example, if single or mixed metal oxides are to be reduced (MOE) to form a refined metal product, oxygen ions will flow towards anode 130 and be oxidized with each ion releasing electrons to evolve oxygen gas, while metal ions flow towards the current collector 120 and are reduced by having the positively charged metal ions add the aforementioned electrons. The metal that forms proximal to the refractory base 115 in region 150 initially is molten, negatively charged metal, and will act as the cathode of the MOE cell. This negatively charged, molten metal may be refined by the process and extracted from the vessel through one or more ports 112. In an MOE application, region 140 of the vessel contains molten electrolyte; it likely contains slag in an electric arc furnace (EAF) application. Bubbles of oxygen gas 142 develop and are released from the vessel. Alternatively, anode 130 may be mainly carbon, in which case, ultimately, the evolved gas might be CO or $CO_2$.

As molten metal may operate as the cathode in an MOE operation, the materials used in current collector conductive elements 125 (see FIG. 9A) may be chosen based on their conductive qualities. For example, conductive elements 125 may include silver, copper, gold, aluminum, zinc, nickel, brass, bronze, iron, platinum, a carbon-containing material, lead, steel, the metal being refined, or alloys/mixtures thereof. By way of example, conductive elements 125 may contain copper, with a melting point of below 1,100° C. However, if the metal being refined is iron, the liquid iron in region 150 may be at a temperature of over 1,500° C. In this example, the molten iron will melt conductive elements 125 to produce a molten mixture of the conductive elements and the metal being refined. Depending on the extent to which the conductive elements melt, a leak may form likely at an interface between part of the current collector and part of the refractory 110. Depending on the severity of the leak, a catastrophic vessel failure may occur. However, the present technology may account for such design concerns as is discussed below.

Figure 9B:
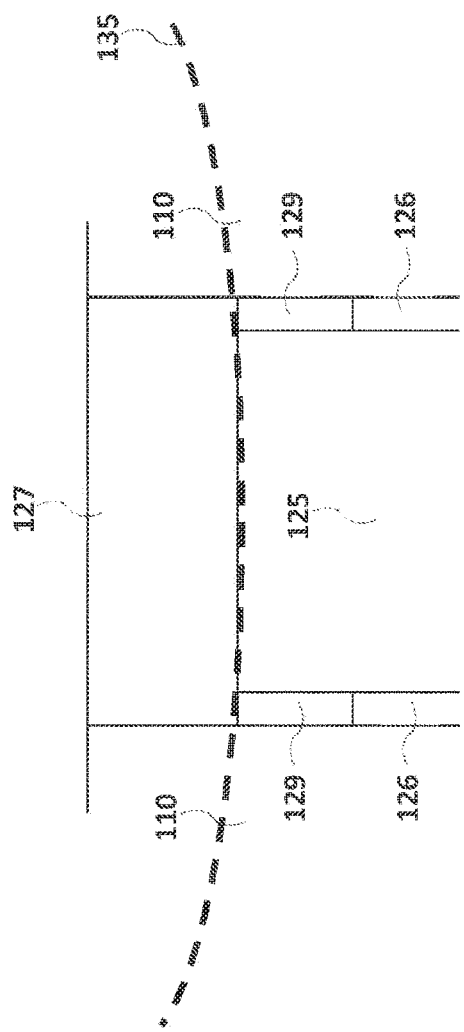
FIG. 9B illustrates a partial cross-sectional view of an exemplary metallurgical vessel according to embodiments of the present technology.

FIG. 2 illustrates a partial cross-sectional view of an exemplary metallurgical vessel 100. In particular, this partial view illuminates a portion of the vessel herein defined as a current collector assemblage 160. Current collector assemblage 160 includes current collector block 120, current collector conductive elements 125 and refractory base 115 that is 1) contiguous with vessel active zone 150 and with collector block 120, 2) having refractory base thickness tb and 3) having base apertures 126 located so as to be indexable with the fixed locations of elements 125 when they are coupled to collector block 120. The partial view illustrates refractory base 115 within a portion of refractory walls 110 and defining a boundary of active zone 150. While FIG. 2 illustrates exactly two elements 125 and two base apertures 126, the actual number and location pattern are application specific. The conductive elements 125 may extend through the base apertures 126 into active zone 150 of vessel 100 (Refer to FIG. 9 A). The length, l of the conductive elements may be equal to, less than the thickness tb of the refractory base, and may also be greater than the thickness tb of the refractory base. As previously noted, conductive elements may contain metal or other conductive material having a melting point lower than the melting temperature of the material being refined within the active zone of the vessel. In such an instance, the portion of the conductive elements 125 in contact with the material within the vessel may also melt. The extent to which this heat transfers through the assembly can determine whether a leak is likely to occur. For example, if the solidus isotherm of the composition instantaneously and locally present in the apertures 126 extends roughly to a depth of contour 135, portions of conductive elements 125 will melt in area 127. This liquid material, which may include a mixture of the material being refined as well, may fill in any interstitial space between the conductive element and the aperture before being re-solidified within the aperture 126. In operation, this may protect against egress of molten material through the aperture to the collector block 120, creating a seal area (like 129 in FIG. 9B). Although theoretically not required (as shown below), additional cooling may be provided to the conductive elements, such as via a fluid transfer to air, water, or some other fluid.

The geometry of apertures 126 affords at least a portion of each of the conductive elements to be in a solid state with the remainder of each of the conductive elements in a melted state. See FIG. 9A—In embodiments, the length of the conductive elements may be maintained at or below a level equal to the thickness of the refractory base 115. In so doing, the material in active zone 150 may be maintained in a substantially purer state, and when this material is removed, or tapped, it is less likely to alloy with material from the conductive elements as well.

FIG. 3 illustrates a perspective view of an exemplary current collector 300 according to embodiments of the present technology. As illustrated, the current collector 300 may include a block 320, which may include one or more bus bars 370 to provide electrical communication with the block. The current collector 300 may also include a plurality of conductive elements 325 extending from the block 320. The conductive elements 325 may be included in a pattern as illustrated, but the number and pattern may be predetermined for a particular metallurgical vessel.

The number, position, and arrangement of conductive elements 325 affects the thermal distribution throughout the vessel and, thus, by deliberately changing the number and position of the conductive elements, the system is adjustable in order to develop stability or equilibrium within the vessel. This pattern/array is determined or configured to provide thermal and/or fluidic equilibrium in the current collector assemblage 160 and its immediate surroundings during operation. Accordingly, for exemplary current collector assemblages and vessels of the present technology, the conductive elements may be positioned upon the current collector block 320 according to a pattern configured to provide thermal and fluidic equilibrium throughout the current collector assemblage during operation.

An important factor in the design of the leak-free current collector assemblage is to ensure control of mixing in the portion 127 of the apertures containing molten of the pin. Convective mixing within the pin carries both higher-temperature liquid and, when the pin and active zone have different compositions, solute to the liquid-solid interface in the pin. The hotter fluid can then melt more of the pin, moving the liquid-solid interface to a location more likely to start a leak. The additional solute will often depress the melting point of the material at that interface, moving the system further toward leakage. Thus, a combination of heat and mass transfer by fluid flow is a key factor in the failure of current collectors in use today. Current industrial solutions use excessive cooling to keep the pins solid in order to prevent these effects, wasting energy and adding unnecessary cost and complexity to the metallurgical vessel. The leak-free current collector assemblage described herein exploits the geometry of the aperture in the refractory portion of the assemblage to determine the fluid flow in the aperture after partial melting and/or dissolution of the pin. Limiting the fluid flow in the aperture greatly reduces the convective mixing in the molten zone, allowing control of the location of the solid-liquid interface with passive cooling. Also, this greatly reduces the energy loss from the vessel, as well as greatly simplifying its supporting systems, all while increasing the life of the current collector assemblage.

Two approaches are used to designing the geometry of the pins and refractory to control the fluid flow in the aperture. In the first, a numerical model is used to describe the fluid flow in the active zone and the apertures to determine the convective transport of heat and mass, and the resulting extent of the liquid zone in the aperture. In the second approach, an approximation is used to estimate the extent to which fluid flow is significant, allowing the rest of the pin to be modeled without consideration of fluid flow. It is well known that flow across the top of a narrow channel, like the apertures, drives flow in the channel and causes mixing of the fluid in the channel (aperture) with the fluid outside the channel (active zone). The flow in the aperture is slower at locations farther from the active zone, becoming negligible at a depth of about 3 diameters below the top of the bore. For non-circular bores, an effective diameter may be estimated as the diameter of a cylinder of equivalent cross-sectional area.

(ii) Application of Current Collector Assemblage in Hall-Héroult Cells

Figure 7A:
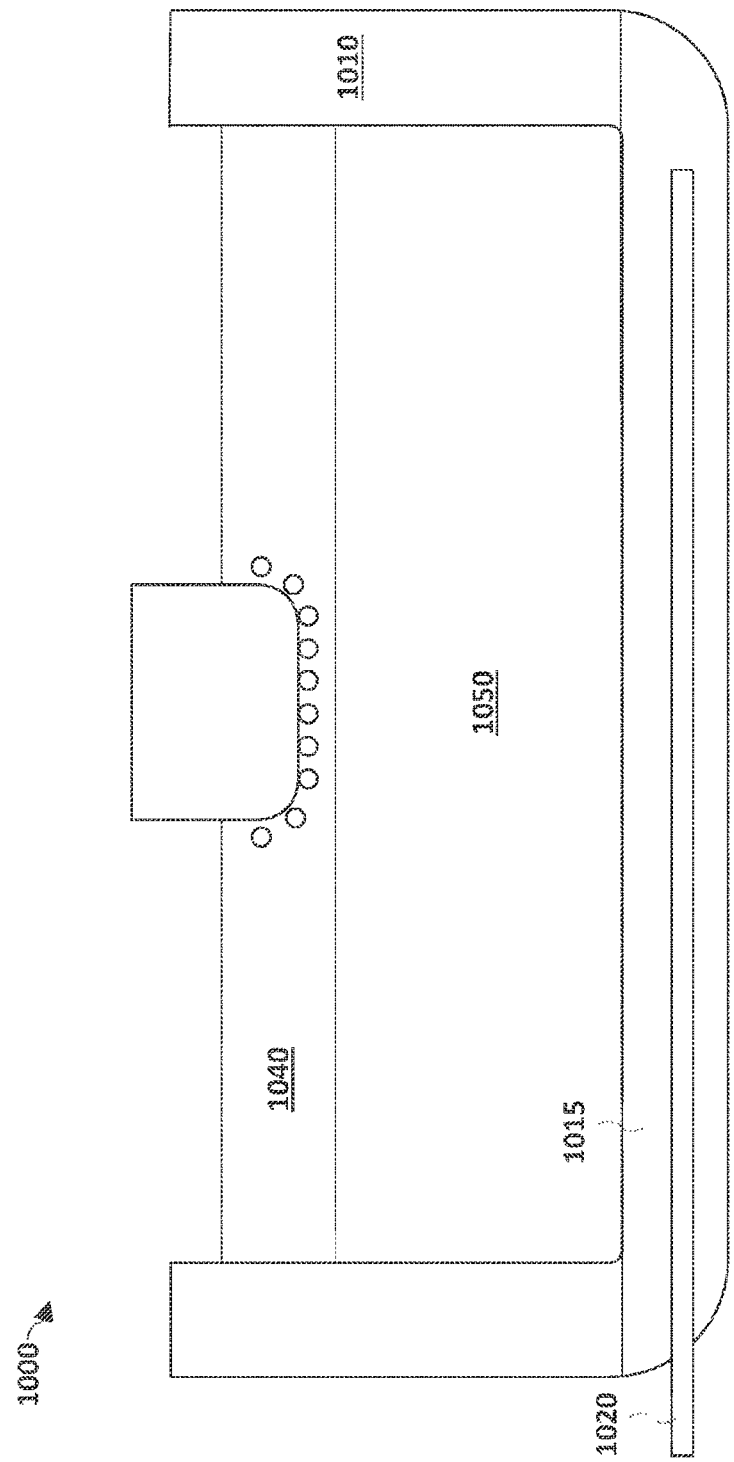
FIG. 7A illustrates a cross-sectional view of an exemplary metallurgical vessel.

The Hall-Héroult process remains the manufacturing process for smelting aluminum. It involves dissolving aluminum oxide in molten fluorides, and electrolyzing the molten salt bath. Refer to FIG. 7A (prior art) and FIG. 7B. In this application, Hall-Héroult electrolyte 1040 is a mixture of fluorides which will wet sides 1010 and, initially, bottom 1015 of cell 1000, absent sufficient opposing force. The cell bottom 1015 is composed of carbon and carbonaceous materials which provide the electrical connection between the current collector block 1020 and liquid metal (aluminum) pad 1050 resident in the active zone of vessel 1000. If electrolyte 1040 infiltrates the interface between current collector block 1020 and aluminum pad 1050, it will freeze and form an insulating layer, breaking the electrical connection between block 1020 and pad 1050. Breaking this electrical contact will, at the very least, result in a cessation of production of aluminum, and may result in a catastrophic failure of the cell. As a result, a very thick metal pad 1050 (as shown in FIG. 7A prior art) is needed to provide enough weight to prevent the ingress of enough electrolyte 1040 to break the electrical contact between the cell bottom 1015 and metal pad 1050.

Figure 7B:
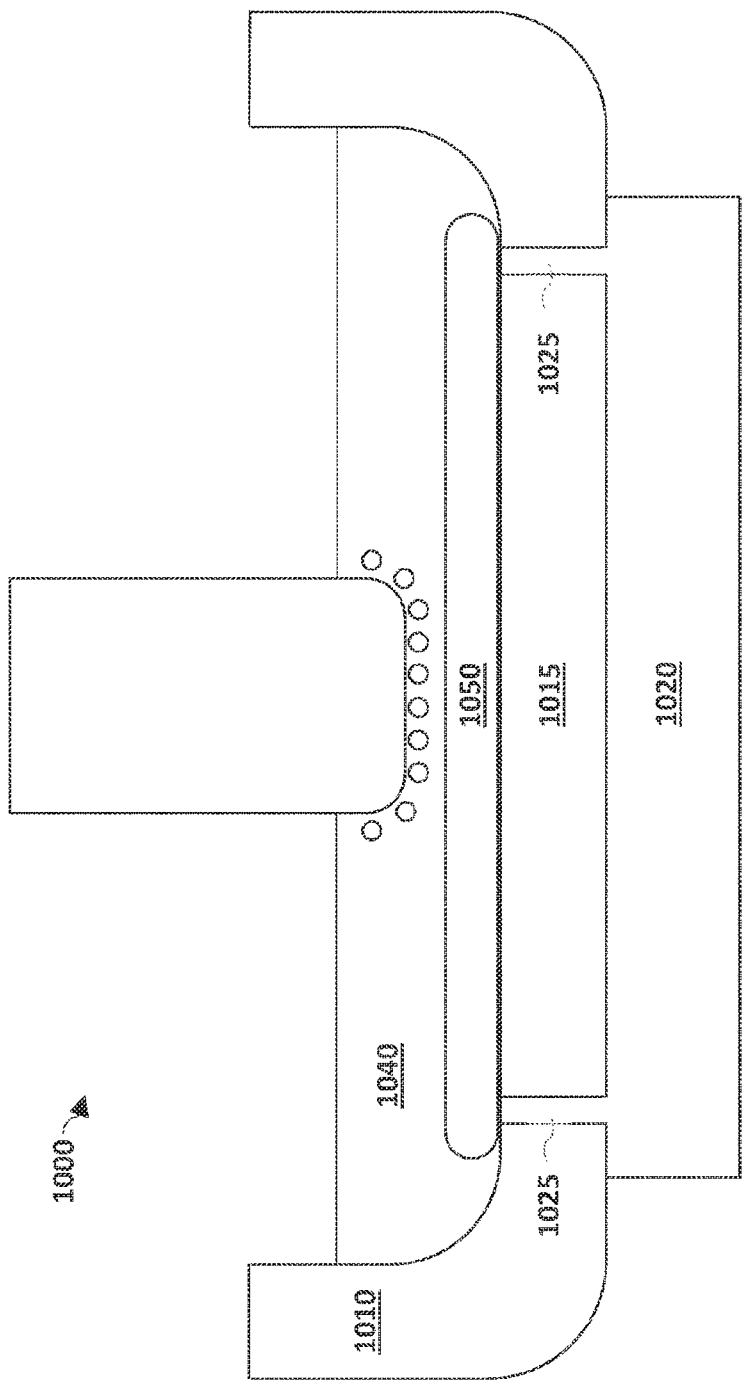
FIG. 7B illustrates a partial cross-sectional view of an exemplary metallurgical vessel according to embodiments of the present technology.

FIG. 7B illustrates use of metallic conductive elements 1025 (two are shown) in a current collector assemblage to insure that electrical communication between liquid metal pad 1050 and a block 1020 is maintained. Elements 1025 might consist of molten aluminum so as to limit the introduction of unwanted impurities to pad 1050. If elements 1025 are metal (ideally of the same composition as the pad 1050), surface tension acts to maintain continuity and electrical conduction across the interface between the metal pad 1050 and the current collector 1020, regardless of any ingress of the electrolyte between the cell bottom 1015 and the metal pad 1050. As the elements 1025 are conductive, the cell bottom 1015 may be made of carbon, or be constructed of another material, even an electrical insulator. The elements 1025 have the effect/properties of: 1) maintaining electrical communication with the metal pad 1050 regardless of ingress of electrolyte between 1020 and 1050; 2) can be arranged so as to provide a continuous barrier of metal around the perimeter of the pad 1050 so as to prevent the ingress of electrolyte entirely and 3) pinning the liquid metal pad 1050 to maintain an acceptable shape even with a much shallower liquid metal pad.

(iii) Model for Manufacturing Leak-Free Current Collector Assemblages

Because the number and arrangement of the conductive elements may produce or enhance effects on the performance and stability of the current collector assemblage, different assemblies may be developed for different applications, having different current collector designs. The position of the plurality of conductive elements may be determined by a finite element analysis model configured to determine a number and a position of conductive elements to provide thermal and fluidic equilibrium within a vessel. Such a model will be described with reference to FIG. 4 below.

Figure 4A:
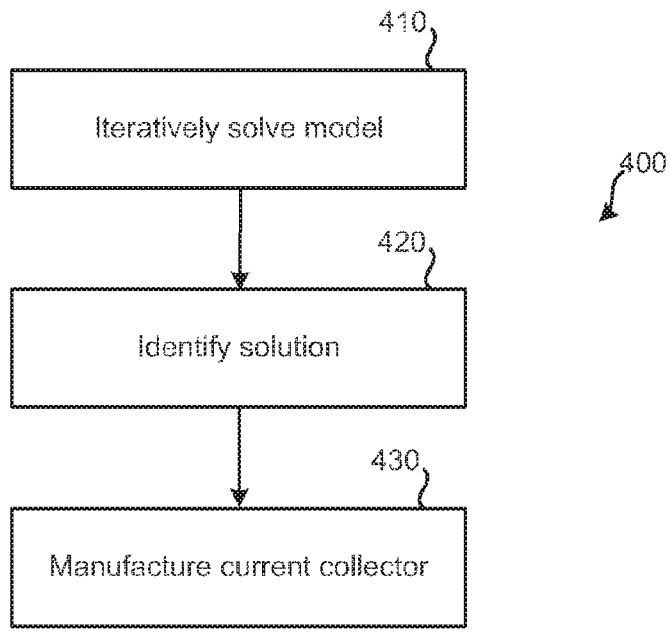
FIG. 4A shows an exemplary method of manufacturing a current collector assembly according to embodiments of the present technology.

The systems and devices previously described may be developed or manufactured according to various methods. The methods may also be represented by programming stored in memory of a computing device. FIG. 4A illustrates an embodiment of a method 400 for manufacturing a current collector assembly according to the present technology. Method 400 may be performed to produce any of the current collectors or components previously described. Each operation of method 400 may be performed at or by a single electronic device, such as by a computer, or by multiple devices communicating with one another. Means for performing each step of method 400 may include a computer or an electronic device. Method 400 may be performed using a computerized device, such as a device incorporating some or all of the components of computer system 600 of FIG. 6.

Method 400 may include solving a model on a computer at operation 410 to determine the number and position of conductive elements for a current collector as previously described. The model may utilize received inputs including a variable number and arrangement of conductive elements. The model may determine and output a heat distribution within a hypothetical current collector assembly in embodiments. The method may also identify a solution to the model at operation 420. The solution may identity a number and arrangement of conductive elements coupled with a current collector that produces a contained heat distribution within the hypothetical current collector assembly. Once a solution to the model has been identified, the method may include manufacturing the current collector at operation 430. The manufactured current collector assembly may include a defined plurality of apertures within a refractory base of the current collector assembly. The plurality of apertures may be positioned in a pattern configured to receive the number and arrangement of conductive elements identified as the solution to the model.

In embodiments, the outputs of the model may include the distribution of temperature within the refractory, as well as heat fluxes and heating power in the system. The inputs may be one or more of a number of items related to the process being performed. For example, the inputs may include physical, chemical, and electrical properties of a metal to be refined or processed within a metallurgical vessel. For example, the melting temperature of such a material may directly affect the extent to which melting of the conductive elements may occur. The inputs may include aspects of the electrical system including the current or power being delivered through the vessel, such as the amperage provided to the electrodes or the terminal voltage. The inputs may also include properties of the refractory or vessel. Overall dimensions of the refractory may be utilized, along with dimensions of the current collector block, as well as fixed parameters of the conductive elements, which may include the length and diameter of the conductive elements. In other embodiments these numbers may also be adjusted to further affect the system. The model may also utilize adjustable inputs, which may include any of the previously identified parameters, as well as an initial number and arrangement of the conductive elements. In embodiments an initial arrangement may not be utilized in the model, but in some embodiments at least one of the inputs received to the model may include an initial number and arrangement of conductive elements.

Many of these parameters may be included in a database accessible to the computer running the model. The computer may also be configured to update the database with adjusted parameters, such as the number and arrangement of the conductive elements. The model may then determine one or more solutions involving a number and arrangement of conductive elements including with operations as further detailed in FIG. 4B.

Figure 4B:
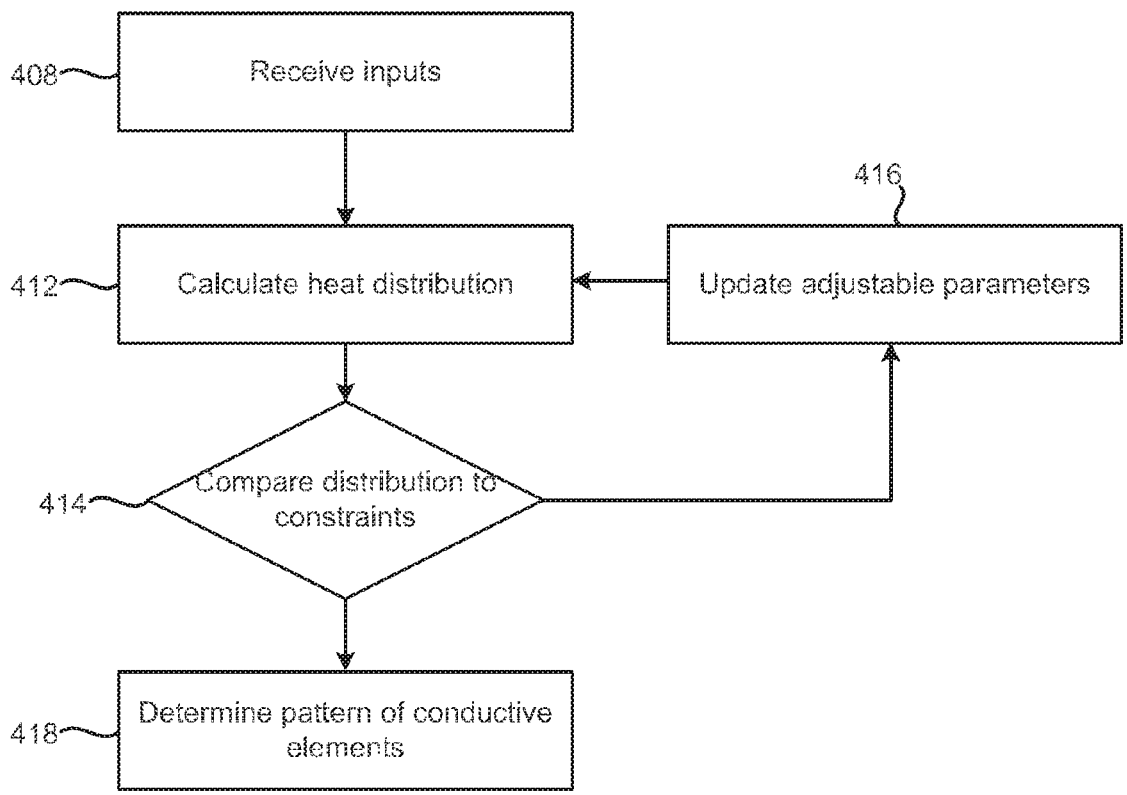
FIG. 4B shows an exemplary method of iteratively solving a model according to embodiments of the present technology.

FIG. 4B includes additional operations that may be included to solve the model according to embodiments of the present technology. The method may include receiving one or more inputs as previously identified at operation 408. In embodiments, receiving inputs may also include accessing a database of physical and electrical properties for a given metal-containing material and/or for the current collector assembly. The inputs may also include receiving or defining constraints for the model, which may simplify the model or enable development of an adequate design. Once the inputs are received, the model may develop or calculate heat distribution for the received parameters at operation 412. The model may repetitively calculate the heat distribution within the current collector assembly while updating the number and arrangement of conductive elements.

For each iteration of the model, the model may repetitively compare the heat distribution of each output within the hypothetical current collector assembly to the defined constraints for the model at operation 414. If the constraints have not been satisfied for the proposed arrangement, the number and/or arrangement of the conductive elements may be updated along with any other adjustable parameters of the system at operation 416. The iterations may continue until operation 418 when a proposed number and arrangement of conductive elements have been determined that provide contained heat distribution within the current collector assembly and that satisfy the defined constraints for the model.

The model may repetitively calculate the heat distribution by solving one or more equations to determine the heat distribution and flow. The equations may include the following exemplary equations:

$$\rho C_p \frac{dT}{dt} - \vec{\nabla} \cdot (k \vec{\nabla} T) = \dot{Q}_v$$

$$\vec{\nabla} \cdot \vec{E} = 0$$

$$\vec{J} = \sigma \vec{E}$$

$$\dot{Q}_v = \vec{J} \cdot \vec{E}$$

$$\vec{\nabla} \cdot \vec{u} = 0$$

$$\rho \frac{d\vec{u}}{dt} + \rho \vec{u} \cdot \vec{\nabla} \vec{u} = -\vec{\nabla} P + \mu \nabla^2 \vec{u} + F_v$$

where $\rho C_p$ is density times specific heat, T is temperature, t is time, k is thermal conductivity, $\dot{Q}_v$ is volumetric generation rate of heat, $\vec{E}$ is electric field, $\vec{J}$ is current density, $\sigma$ is electrical conductivity, $\vec{u}$ is the velocity vector, P is the pressure, $\mu$ is the viscosity, and $F_v$ is the sum of volumetric forces including gravitational forces.

The model may employ a finite-element analysis to solve for the distribution of temperature, heat fluxes, and Joule heating within the assembly. Designs of the model may also be limited to conditions for which the fluid flow is not significant, for example, alleviating the need to solve certain of the equations. Additionally, in embodiments the model may utilize the aggregation of variables related to particular products or process parameters to simplify equations to provide a range of acceptable arrangements as opposed to a single design, while still providing thermal and electrical equilibrium within the boundary at which the material being processed contacts the conductive elements.

The constraints applied to the system may include boundary conditions or other parameters to control the potential of leak or breakdown from occurring. The constraints may include a limit to the temperature allowed at the interface of the current collector assembly with the material being processed, which may also be a surface of the refractory base opposite a surface in contact with the current collector. The constraints may also include a limit on total heat flow from the current collector assembly into the material being processed or elsewhere, as well as a limit on the maximum temperature at any location within the current collector assembly. Additional constraints may include the location of a melting temperature of a material utilized in the metallurgical vessel characterized by the lowest melting temperature of all materials utilized in the metallurgical vessel. For example, such a temperature may be limited to a distance from all surfaces to reduce or limit leak potential. Such a distance may be in inches, for example, such as inches from any joint or edge surface of the current collector assemblage.

The outputs from the model may include a graphical depiction of an isotherm at the melting point of a given metal-containing material contacting the hypothetical current collector assembly in embodiments. The model may also output a pattern for manufacture that is delivered to one or more machining tools. The pattern may be output to a tool that manufactures the current collector assembly, for example. The pattern may include a defined plurality of apertures within a refractory base of the current collector assembly in a pattern configured to receive the number and arrangement of conductive elements identified as the solution to the model.

The model may also be used in a modified calculation by which input and output parameters are exchanged to solve related issues. For example, the model may be able to determine required properties for components of a system based on pre-selected arrangements of other materials, including the conductive elements. As one non-limiting example, the model may be able to iteratively evaluate the distributions of temperature and heat flux while varying the thermal conductivity of a particular component to determine the outer bounds of such a parameter while still maintaining a target temperature and heat flux at a different location within the assembly. Many other examples are equally encompassed by the present technology as will be readily apparent to those of skill.

Figure 5A:
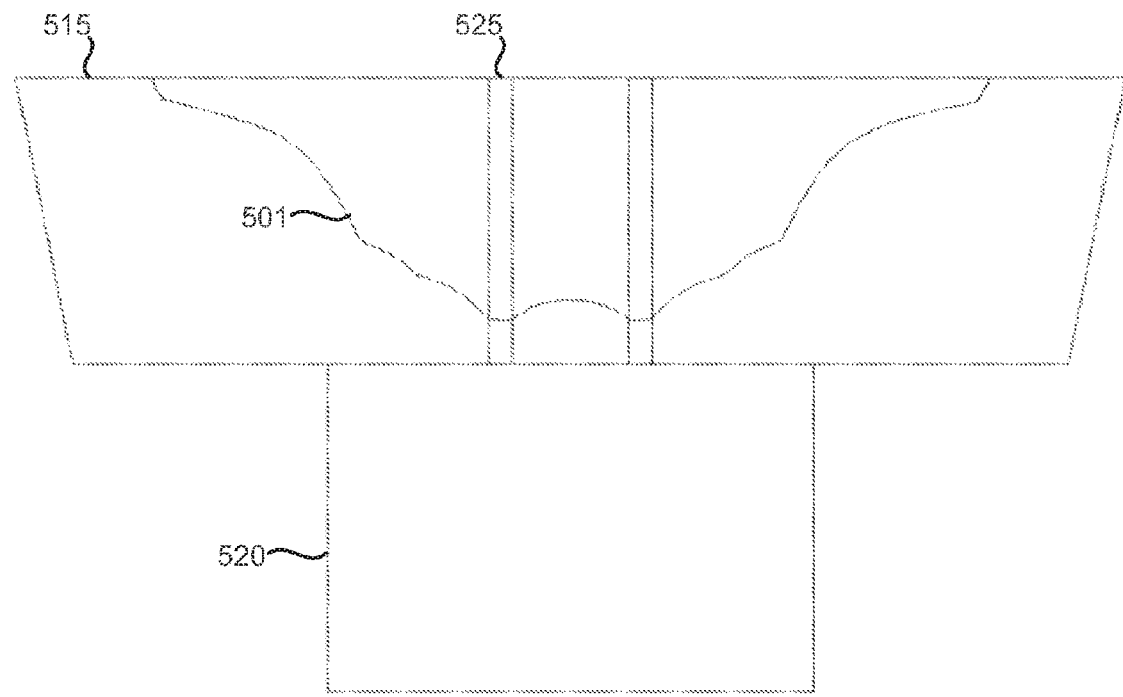
FIG. 5A illustrates an exemplary heat distribution along a cross-section of a current collector assembly according to embodiments of the present technology.

FIG. 5A illustrates an exemplary heat distribution along a cross-section of a current collector assembly according to embodiments of the present technology. The figure includes an exemplary output from the model. As illustrated, the figure includes a refractory base 515, a current collector block 520, and conductive elements 525 in a particular arrangement and number as determined by the model. The figure also illustrates a calculated isotherm 501 at the melting point of the pre-defined product in an exemplary design scenario. As illustrated by the isotherm 501, the liquid metal is confined within the aperture of the refractory base 515, and leakage or device failure is unlikely.

Figure 5B:
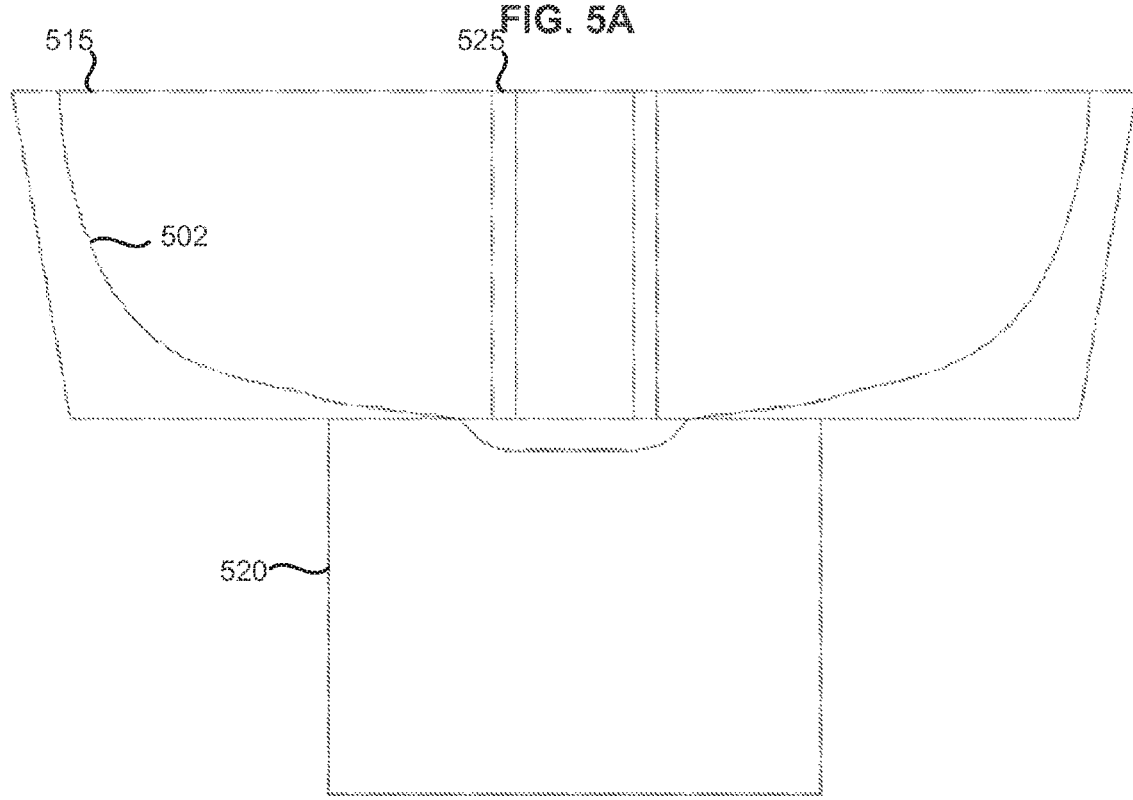
FIG. 5B illustrates an exemplary heat distribution along a cross-section of a current collector assembly according to embodiments of the present technology.

FIG. 5B illustrates an exemplary heat distribution along a cross-section of a current collector assembly according to embodiments of the present technology. The figure includes an exemplary output from the model. As illustrated, the figure includes a refractory base 515, a current collector block 520, and conductive elements 525 in a particular arrangement and number as determined by the model. The figure also illustrates a calculated isotherm 502 at the melting point of the pre-defined product in an exemplary design scenario. As illustrated by the isotherm 502, the liquid metal is likely to extend into the current collector block 520, but is likely to be contained by the block and the refractory. Although such a scenario may pose a risk over the scenario illustrated in FIG. 5A, the design may be determined to be of sufficient integrity to proceed with manufacture or operation.

Figure 5C:
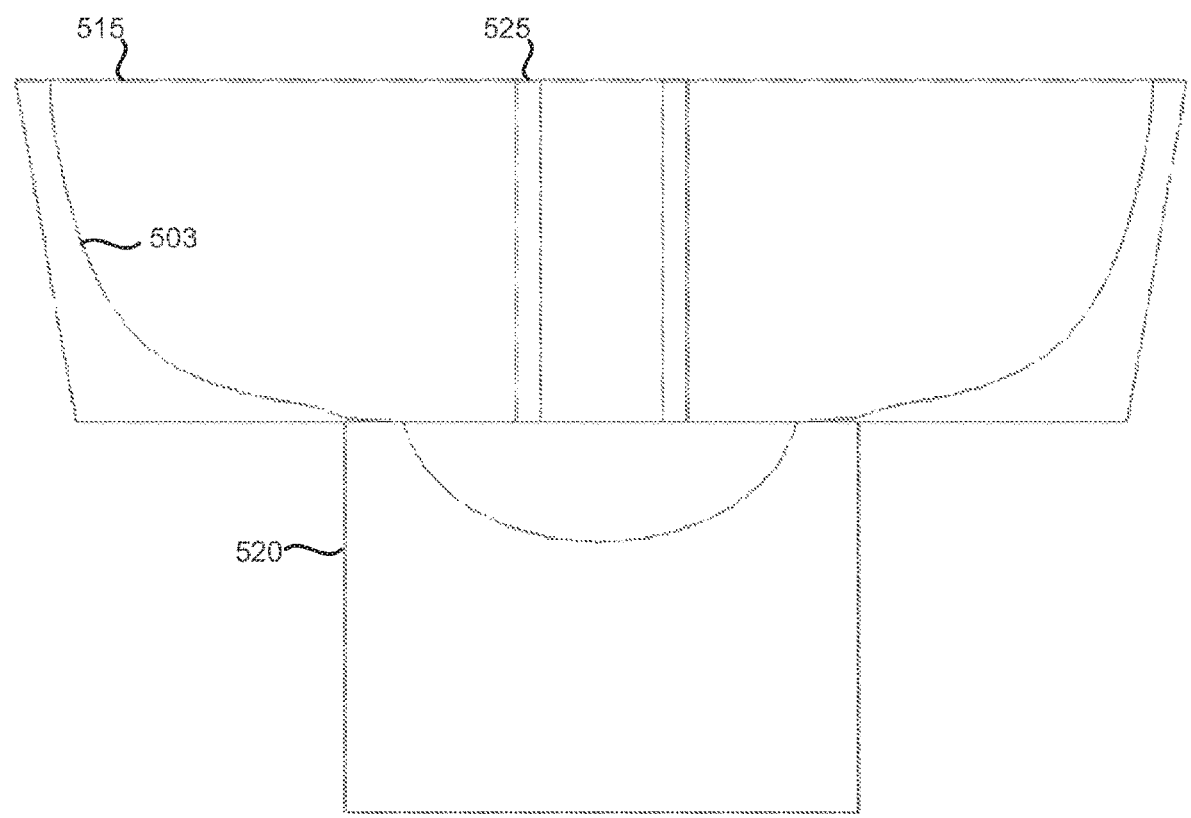
FIG. 5C illustrates an exemplary heat distribution along a cross-section of a current collector assembly according to embodiments of the present technology.

Such exemplary isotherms as illustrated in FIGS. 5A and 5B, may be at least in part developed by the number and arrangement of the plurality of conductive elements in the assembly. The conductive elements may be configured to at least partially develop a temperature profile within the current collector assemblage that maintains a boundary of a melting point temperature of a material processed in the vessel. In embodiments, the boundary may be maintained within the refractory base, or may extend within the current collector block, but may be maintained within an interior portion of the collector block FIG. 5C illustrates an exemplary heat distribution along a cross-section of a current collector assembly according to embodiments of the present technology. The figure includes an exemplary output from the model. As illustrated, the figure includes a refractory base 515, a current collector block 520, and conductive elements 525 in a particular arrangement and number as determined by the model. The figure also illustrates a calculated isotherm 503 at the melting point of the pre-defined product in an exemplary design scenario. As illustrated by the isotherm 503, the liquid metal is likely to extend into the block, and may be only marginally contained by the refractory 515. Although the scenario illustrates a stable condition, under perturbation of the system, which may be common in actual operation, leakage and catastrophic failure are likely to occur.

The present technology allows modeling of metallurgical vessels for processing of a variety of metals, alloys, and other products. By utilizing the iterative process and developing heat profiles as described above, vessels developed by the described methods are less prone to leak and failure than conventional designs. Additionally, individualized vessels can be developed for particular processing operations as opposed to attempting to repurpose an existing vessel for a process for which it may not be suited. The present model can determine whether such a vessel can be used for alternative purposes or whether the vessel is more likely to fail.

Figure 6:
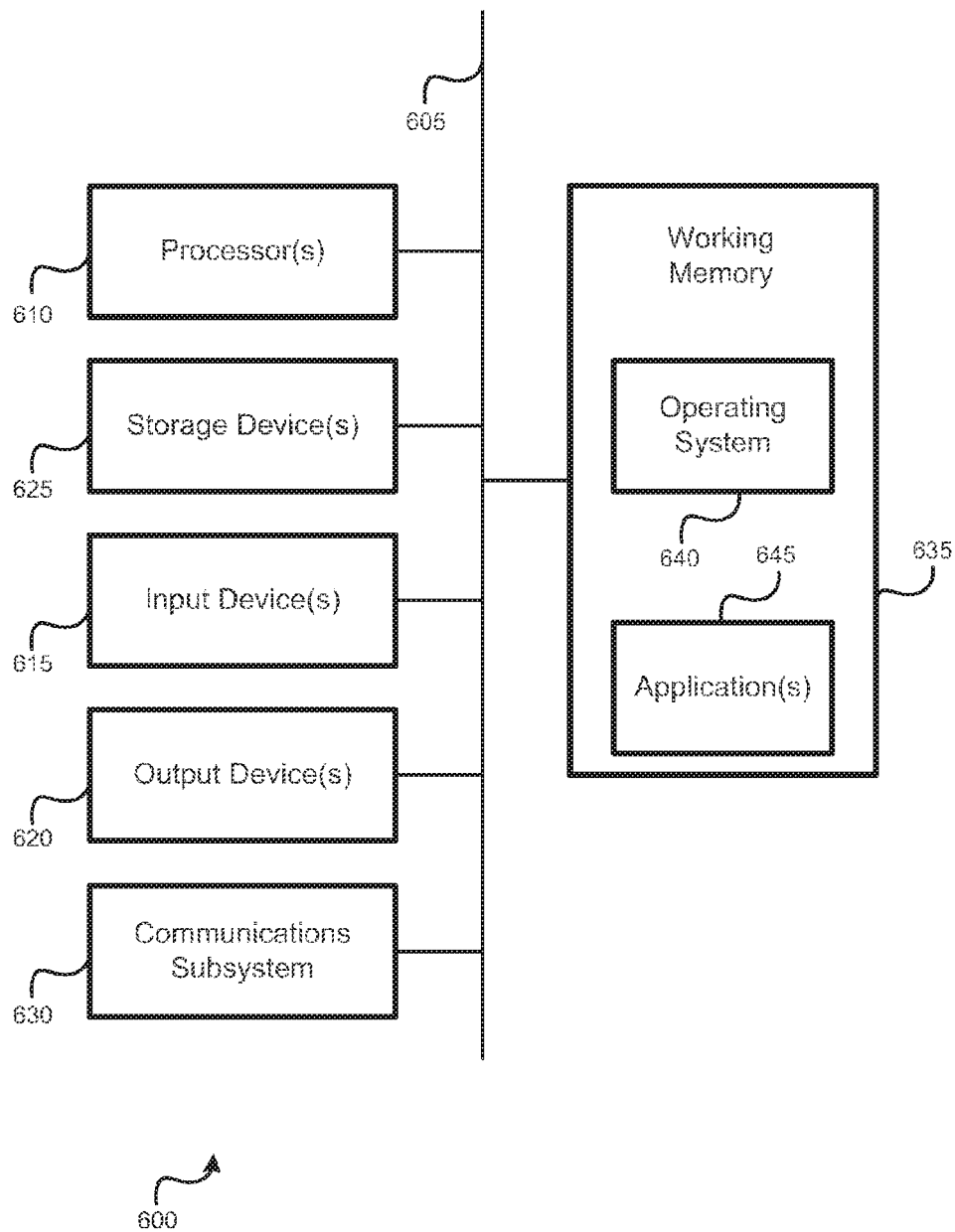
FIG. 6 shows a simplified computer system that may be utilized to perform one or more of the operations discussed in embodiments of the present technology.

FIG. 6 illustrates an embodiment of a computer system 600. A computer system 600 as illustrated in FIG. 6 may be incorporated into devices such as a personal computer, a manufacturing computer system, particular tools or tooling devices, and the like. Moreover, some or all of the components of the computer system 600 may also be incorporated into a portable electronic device, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device may be incorporated into the computer system 600, e.g., a manufacturing computer system, as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

An illustrative example to more particularly illuminate the utility of the aforementioned model. 1) a change in both refractory material composition/nature and in thermal operating conditions of the vessel is proposed with respect to an MOE application; 2) model now to evaluate whether or not to change the design, the number and/or the patterned arrangement of the conductive elements (and associated apertures in the refractory base) would be necessary to help insure a leak-free current collector assemblage. The first step is to take as inputs 408 for the model, the new operating conditions, the properties of the new refractory material, and a trial number and arrangement of the conductive elements (the trial number, etc. usually is associated with a previously successful, leak-free assemblage) and calculate 412 a first thermal distribution. Illustrative examples of operating conditions, properties, etc. typically are, but are in no way limited to: elements being mild steel with a half inch cross-section and a length of 7", the refractory base having a thermal conductivity of 1 W/m-K and a tb of 7", operating current of 4600 amperes, and metal being refined to be held at a temperature of 1650° C. The next step, in this example, is a comparison of this first calculated thermal distribution and given process constraints 414 (e.g. maximum temperature anywhere in the assemblage, position of isothermal of a particular temperature relative to boundary between the active zone and a predetermined "depth" into the refractory base ((a fraction of tb)), safety factors, etc.), it is determined that the resulting temperatures are too high. Next, an update 416 of the number, pattern of elements is made, input to the model and the thermal distribution is recalculated 412. If necessary, further iterations 410 are performed leading to a conclusion 420 as to a "correct" number and arrangement, etc. of elements, with the arrangement 418 that satisfies the constraints. In this particular example, that arrangement is the one illustrated in FIG. 3.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a material" includes a plurality of such materials, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Although the invention has been described with reference to several embodiments, it will be understood by one of ordinary skill in the art that various modifications can be made and extension to other types of metallurgical vessels can be made without departing from the spirit and the scope of the invention, as set forth in the claims.

What is claimed is:

1. A method of manufacturing a current collector assembly, the method comprising:
   iteratively solving a model on a computer, utilizing received inputs including a variable number and arrangement of conductive elements, to determine as an output a heat distribution within a hypothetical current collector assembly;
   identifying as a solution to the model a number and arrangement of conductive elements coupled with a current collector that produces a contained heat distribution within the hypothetical current collector assembly; and
   manufacturing the current collector assembly, wherein the current collector assembly comprises a defined plurality of apertures within a refractory base of the current collector assembly in a pattern configured to receive the number and arrangement of conductive elements identified as the solution to the model.

2. The method of claim 1, wherein iteratively solving the model comprises:
   receiving as at least one of the inputs an initial number and arrangement of conductive elements;
   accessing a database of physical and electrical properties for a given metal-containing material and the current collector assembly;
   defining constraints for the model; and
   repetitively calculating the heat distribution within the hypothetical current collector assembly while updating the number and arrangement of conductive elements.

3. The method of claim 2, further comprising:
   repetitively comparing the heat distribution within the hypothetical current collector assembly to the defined constraints for the model; and
   determining a number and arrangement of conductive elements providing a contained heat distribution within the hypothetical current collector assembly that satisfy the defined constraints for the model.

4. The method of claim 2, wherein repetitively calculating the heat distribution comprises determining the heat distribution within the hypothetical current collector assembly based on the solution to at least the following equation:

$$\rho C_p \frac{dT}{dt} - \vec{\nabla} \cdot (k\vec{\nabla}T) = \dot{Q}_v$$

wherein $\rho C_p$ is density times specific heat, T is temperature, t is time, k is thermal conductivity, and $\dot{Q}_v$ is volumetric generation rate of heat.

5. The method of claim 2, wherein defining constraints on the model includes defining at least one of: the temperature of the assembly at a surface of the assembly opposite a surface in contact with the current collector, the total heat flow from the hypothetical current collector assembly, the maximum temperature of materials within a metallurgical vessel comprising the hypothetical current collector assembly, or the location of a melting temperature of a material utilized in the metallurgical vessel characterized by the lowest melting temperature of all materials utilized in the metallurgical vessel.

6. The method of claim 2, further comprising receiving an input for the electrical current provided through the conductive elements.

7. The method of claim 2, wherein iteratively solving the model comprises outputting a graphical depiction of an isotherm at the melting point of the given metal-containing material contacting the hypothetical current collector assembly.

8. The method of claim 1, wherein the conductive elements comprise a material selected from the group consisting of silver, copper, gold, aluminum, zinc, nickel, brass, bronze, iron, platinum, a carbon-containing material, lead, and steel.

9. The method of claim 1, wherein the contained heat distribution within the hypothetical current collector assembly produces an isotherm ensuring that a portion of the conductive elements is solid within the apertures within the refractory base of the current collector assembly.

10. The method of manufacturing a current collector assembly of claim 9, wherein the number and arrangement of conductive elements produces a contained heat distribution within the hypothetical current collector assembly.

11. A method of manufacturing a current collector assembly, the method comprising:
receiving as an input for a model an initial number and arrangement of conductive elements for a hypothetical current collector assembly;
iteratively solving the model on a computer to determine as an output a heat distribution within a hypothetical current collector assembly;
identifying as a solution to the model a number and arrangement of conductive elements associated with a current collector; and
manufacturing the current collector assembly, wherein the current collector assembly comprises a defined plurality of apertures within a refractory base of the current collector assembly in a pattern configured to receive the number and arrangement of conductive elements identified as the solution to the model.

12. The method of claim 11, wherein iteratively solving the model comprises:
accessing a database of physical and electrical properties for a given metal-containing material and the current collector assembly;
defining constraints for the model; and
repetitively calculating the heat distribution within the hypothetical current collector assembly while updating the number and arrangement of conductive elements.

13. The method of claim 12, further comprising:
repetitively comparing the heat distribution within the hypothetical current collector assembly to the defined constraints for the model; and
determining a number and arrangement of conductive elements providing a contained heat distribution within the hypothetical current collector assembly that satisfy the defined constraints for the model.

14. The method of claim 12, wherein repetitively calculating the heat distribution comprises determining the heat distribution within the hypothetical current collector assembly based on the solution to at least the following equation:

$$\rho C_p \frac{dT}{dt} - \vec{\nabla} \cdot (k\vec{\nabla} T) = \dot{Q}_v$$

wherein $\rho C_p$ is density times specific heat, T is temperature, t is time, k is thermal conductivity, and $\dot{Q}_v$ is volumetric generation rate of heat.

15. The method of claim 12, wherein defining constraints on the model includes defining at least one of: the temperature of the assembly at a surface of the assembly opposite a surface in contact with the current collector, the total heat flow from the hypothetical current collector assembly, the maximum temperature of materials within a metallurgical vessel comprising the hypothetical current collector assembly, or the location of a melting temperature of a material utilized in the metallurgical vessel characterized by the lowest melting temperature of all materials utilized in the metallurgical vessel.

16. The method of claim 12, further comprising receiving an input for the electrical current provided through the conductive elements.

17. The method of claim 12, wherein iteratively solving the model comprises outputting a graphical depiction of an isotherm at the melting point of the given metal-containing material contacting the hypothetical current collector assembly.

18. The method of claim 11, wherein the conductive elements comprise one or more of silver, copper, gold, aluminum, zinc, nickel, brass, bronze, iron, platinum, a carbon-containing material, lead, or steel.

19. The method of claim 11, wherein the heat distribution within the hypothetical current collector assembly produces an isotherm ensuring that a portion of the conductive elements is solid within the apertures within the refractory base of the current collector assembly.

20. A method of manufacturing a current collector assembly, the method comprising:
iteratively solving the model on a computer to determine as an output a heat distribution within a hypothetical current collector assembly, wherein the heat distribution within the hypothetical current collector assembly is based on the solution to at least the following equation:

$$\rho C_p \frac{dT}{dt} - \vec{\nabla} \cdot (k\vec{\nabla} T) = \dot{Q}_v$$

wherein $\rho C_p$ is density times specific heat, T is temperature, t is time, k is thermal conductivity, and $\dot{Q}_v$ is volumetric generation rate of heat;
identifying as a solution to the model a number and arrangement of conductive elements associated with a current collector; and
manufacturing the current collector assembly, wherein the current collector assembly comprises a defined plurality of apertures within a refractory base of the current collector assembly in a pattern configured to receive the number and arrangement of conductive elements identified as the solution to the model.

* * * * *